United States Patent [19]

Schulz et al.

[11] Patent Number: 4,463,151

[45] Date of Patent: Jul. 31, 1984

[54] PROCESS FOR THE FORMATION OF NOVEL ACRYLAMIDE ACRYLATE COPOLYMERS

[75] Inventors: Donald N. Schulz, Annandale; John J. Maurer, New Providence; Jan Bock, Bridgewater, all of N.J.

[73] Assignee: Exxon Research and Engineering Co., Florham Park, N.J.

[21] Appl. No.: 454,285

[22] Filed: Dec. 29, 1982

[51] Int. Cl.$^3$ .......................................... C08F 220/56
[52] U.S. Cl. .............................. 526/307.5; 526/307.7
[58] Field of Search ................ 526/303.1, 225, 307.2, 526/307.5, 307.7

[56] References Cited

U.S. PATENT DOCUMENTS

| | | | |
|---|---|---|---|
| 3,201,304 | 8/1965 | Munjat | 526/307.5 |
| 3,629,209 | 12/1971 | McDonald et al. | 526/307.2 |
| 3,931,111 | 1/1976 | Kopecek et al. | 526/307.2 |
| 3,988,305 | 10/1976 | Stol | 526/307.5 |
| 4,323,463 | 4/1982 | Morduchowitz | 526/307.5 |
| 4,338,425 | 7/1982 | Dougherty et al. | 526/225 |

FOREIGN PATENT DOCUMENTS

| | | |
|---|---|---|
| 63018 | 4/1982 | European Pat. Off. |
| 1182828 | 12/1964 | Fed. Rep. of Germany ... 526/307.5 |

Primary Examiner—Joseph L. Schofer
Assistant Examiner—Peter F. Kulkosky
Attorney, Agent, or Firm—Richard E. Nanfeldt

[57] ABSTRACT

The present invention relates to a process for the formation of water soluble copolymers of acrylamide and alkyl poly(etheroxy)acrylate which are excellent viscosification agents, wherein the process includes the free radical copolymerization of acrylamide monomer and alkyl poly(etheroxy)acrylate monomer in an aqueous medium under nitrogen conditions in the presence of free radical initiator at a sufficient temperature and for a sufficient time to effect copolymerization.

8 Claims, 1 Drawing Figure

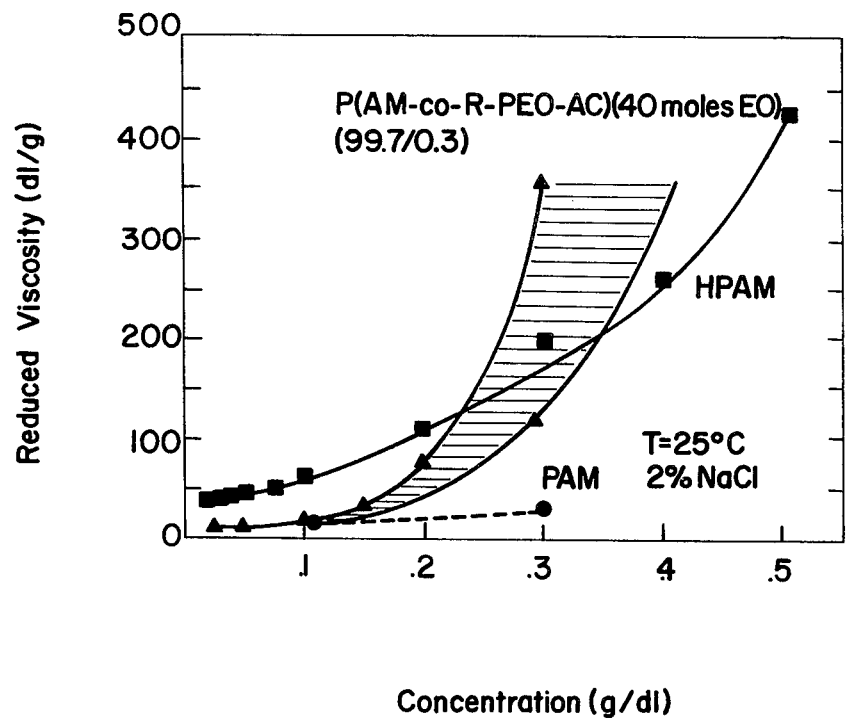

PROCESS FOR THE FORMATION OF NOVEL ACRYLAMIDE ACRYLATE COPOLYMERS

BACKGROUND OF THE INVENTION

Polyacrylamide (PAM) and hydrolyzed polyacrylamide (HPAM) are common water soluble polymers that have found application in oil field chemicals, paints, paper making, cosmetics, etc. The solution rheology of these materials define their use in these applications. With these polymers, aqueous viscosification or thickening is achieved through a combination of high molecular weight and chain expansion due to repulsion of pendent ionic groups along the polymer chain. High molecular weight polymers are difficult to prepare and dissolve and are also sensitive to shear. Viscosification due to charge repulsion is salt sensitive and thus, finds limited utility in highly saline systems.

Polymerizable esters of acrylic acid or methacrylic acid with alkyl or alkylaryl poly(ethyleneoxy) ethyl alcohols are disclosed in Dickstein U.S. Pat No. 4,075,411.

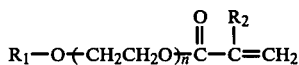

Trecker, U.S. Pat. No. 3,896,161 and British Pat. No. 828,496. Such monomers have found use in the preparation of stable latexes and special textiles.

Copolymers of base-neutralized acrylic acid and nonionic surfactant acrylates have also found use as thickeners for both aqueous solutions and water/organic liquid emulsions (Koenig and Bryant, U.S. Pat. No. 4,268,641). Improved NaCl tolerance is also taught therein. A liquid composition useful as a thickening agent in polymer latexes, comprising a mixture of solvent and a terpolymer of acrylic acid, an ester of the formula of:

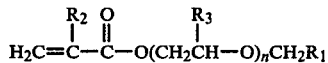

and an alkyl acrylate or methacrylate is claimed in U.S. Pat. No. 4,138,381.

PRESENT INVENTION

Unlike the prior art, the present invention discloses substantially copolymers of acrylamide and nonionic surfactant monomers such as

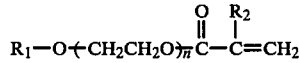

where $R_1$=alkyl, $C_1$-$C_{20}$; aryl, $C_6$-$C_{30}$; alkylaryl, $C_6$-30; and $R_2$=H or $CH_3$; n=1-60. These surfactant monomers can be referred to as alkyl poly(etheroxy)acrylates or R-(PEO)-AC.

The compositions of the instant invention are distinguished from nonionic polyacrylamide homopolymers by their higher solution rheological behavior, e.g., viscosification efficiencies. They are different from hydrolyzed polyacrylamide, a copolymer of acrylic acid and acrylamide, by virtue of their higher thickening ability and concentration dependence of viscosity in a brine environment and often higher retention of viscosity in the presence of inorganic electrolytes. Of course, viscosities of polymer solutions containing inorganic electrolytes are a function of such factors as polymer structure, molecular weight, concentration, amount of alkyl (etheroxy)acrylate, etc.

The present invention is distinct from the acrylic acid salt and nonionic surfactant acrylates of Koenig and Bryant because different comonomers (i.e., acrylamide vs. salts of acrylic acid) and aqueous, rather than hydrocarbon emulsion polymerization methods, are used. Moreover, the instant copolymers are prepared in a one-step process, i.e., neutralization is not required. Acrylic acid-based polymers are to be avoided because of the known susceptibility of acrylic acid (and its salts) to precipitation by polyvalent cations (e.g., $Ca^{++}$); the latter species are often found in geological formations. (F. J. Glaris in "Water Soluble Resins 2nd Ed", R. L. Davidson and M. Sittig, Eds., Rheinhold, N.Y., p. 168).

The instant invention describes a novel class of acrylamide copolymers containing alkyl poly(etheroxy) acrylate groups. These copolymers are water soluble and many exhibit salt insensitive aqueous viscosification. The mechanism of solution viscosity enhancement is different from that found in the prior art systems based on polyacrylamide and hydrolyzed polyacrylamide. In the compositions of the present invention, the presence of a small amount of hydrophobic or water insoluble alkyl group on the surfactant comonomer is believed to result in intermolecular aggregation or interaction in solution. This aggregation results in enhanced viscosity relative to a noninteracting polymer such as polyacrylamide. Furthermore, the presence of ethylene oxide groups on the surfactant comonomer can be used to adjust polymer solubility and influence viscosity. The relative salt insensitivity of the solution viscosity of these novel copolymers distinguishes them from viscosifiers based on charge repulsion such as hydrolyzed polyacrylamide.

SUMMARY OF THE INVENTION

The present invention relates to unique and novel water soluble copolymers of acrylamide and alkyl poly(etheroxy)acrylate. These polymers are prepared by a free radical copolymerization process, wherein the acrylamide monomer and alkyl poly(etheroxy)acrylate monomer are added to deoxygenated water under a nitrogen purge; the polymerization solution is heated to a temperature sufficient to activate the initiator; free radical initiator is added to the polymerization solution to initiate polymerization; polymerizing the acrylamide monomer and alkyl poly(etheroxy)acrylate monomer for a sufficient time and at a sufficient temperature to form the water soluble copolymer of acrylamide and alkyl poly(etheroxy)acrylate; and recovering the formed water soluble copolymer from the polymerization solution. Many of these water soluble copolymers of acrylamide and alkyl poly(etheroxy)acrylate are excellent viscosification agents in salt water.

GENERAL DESCRIPTION

The water soluble copolymers of acrylamide and alkyl poly(etheroxy)acrylate of the present invention are formed by a free radical copolymerization process in an aqueous medium. These water soluble copolymers of acrylamide and alkyl poly(etheroxy)acrylate are useful as viscosifiers in water and in aqueous solutions containing inorganic electrolytes.

The free radical copolymerization process used to form these water soluble copolymers of acrylamide and alkyl poly(etheroxy)acrylate comprises adding acrylamide monomer to deoxygenated water under a nitrogen atmosphere; adding alkyl poly(etheroxy)acrylate monomer to the solution of water and acrylamide monomer to form the polymerization solution; heating the polymerization solution to a sufficient temperature to activate the initiator; adding free radical initiator to the polymerization solution to cause initiation of the copolymerization of the acrylamide monomer and the alkyl poly(etheroxy)acrylate monomer; copolymerizing the acrylamide monomer and alkyl poly(etheroxy)acrylate monomer at a temperature of at least 5° C. for at least 2 hours, more preferably at least 20° C., to form the water soluble copolymer of acrylamide and alkyl poly(etheroxy)acrylate; and recovering by precipitation or dialysis of the formed water soluble copolymer of acrylamide and alkyl poly(etheroxy)acrylate from the polymerization solution.

The water soluble copolymers of acrylamide and alkyl poly(etheroxy)acrylate can be substantially represented by the formula:

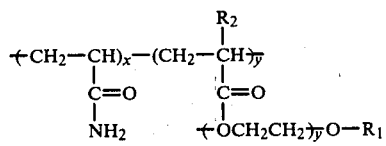

wherein $R_1$ is selected from the group consisting of $C_1$ to $C_{20}$ alkyl groups, $C_6$ to $C_{20}$ aryl groups and $C_6$ to $C_{30}$ alkylaryl groups; $R_2$ is hydrogen or a methyl group, n is about 1 to about 60, more preferably about 5 to about 50, and most preferably about 8 to about 45; y is about 0.01 to about 5.00 mol.%, more preferably about 0.04 to about 3.0, and most preferably about 0.1 to about 1.5; and x is about 95.00 to about 99.96 mole %, more preferably about 97.0 to about 99.06 and most preferably about 99.9 to about 98.5. Typical, but nonlimiting examples of preferred R groups are methyl, octadecyl, phenyl and nonylphenyl.

The instrinsic viscosity of the water soluble copolymers of acrylamide and alkyl poly(etheroxy)acrylate is about 1 to about 25, more preferably about 2 to about 20, and most preferably about 3 to about 10. The intrinsic viscosity, $[\eta]$, is related to the viscosity average molecular weight, $M_v$, by the Mark Houwink relationship: $[\eta] = K \bar{M}_v$.

Suitable alkyl poly(etheroxy)acrylate monomers useful in the preparation of the water soluble copolymers of the instant invention are methyl, dodecyl, octadecyl phenyl, octylphenyl, and nonylphenyl.

Suitable free radical initiators for the instant free radical copolymerization process include potassium persulfate, 2,2'-azobisisobutyronitrile (AIBN), $H_2O_2$, and ethanolamine/sodium sulfite. The concentration of the free radical initiator is about 0.01 to about 1.0 grams per 100 grams of the acrylamide monomer and alkyl poly(etheroxy)acrylate monomer.

The concentration of the acrylamide monomer and alkyl poly(etheroxy)monomers in the aqueous polymerization solution is about 1 to about 20 grams of acrylamide monomer and alkyl poly(etheroxy)monomer per 100 grams of water, more preferably about 3 to about 15, and most preferably about 3 to about 10. Copolymerization of the acrylamide monomer and alkyl poly(etheroxy)acrylate monomer is effected at a temperature of about 5° to about 80° C., more preferably about 20 to about 60, and most preferably about 40 to about 60 for a period of time of about 0.5 to about 48 hours, more preferably about 2 to about 30, and most preferably about 4 to about 24.

Copolymers of acrylamide and alkyl poly(etheroxy)acrylate are recovered from the polymerization solution by precipitation with a nonsolvent (e.g., methanol, isopropanol, or acetone), followed by vacuum drying. An alternative recovery technique involves dialysis followed by freeze drying. Alternatively, dialysis can be used. The water soluble copolymers can be either dried by vacuum or by freeze drying means.

BRIEF DESCRIPTION OF THE DRAWINGS

FIG. 1 illustrates a plot of reduced viscosity versus concentration for an acrylamide polymer, a hydrolyzed acrylamide polymer and a copolymer of acrylamide and alkyl poly(etheroxy)acrylate.

DESCRIPTION OF THE PREFERRED EMBODIMENTS

The following examples illustrate the present invention without, however, limiting the same hereto.

EXAMPLE 1

Polyacrylamide Polymerization

A 500–1000 ml quantity of distilled water was added to a resin flask equipped with a water condenser, thermometer, mechanical stirrer, as well as a nitrogen inlet and outlet. The water was deoxygenated for 15–30 minutes by a nitrogen purge. The acrylamide monomer (AM) (0.42–0.49 mol), Aldrich, was added and the solution further purged at 50° C. with nitrogen for ¾ to 1 hour. The $K_2S_2O_8$ initiator (0.005–0.05 g) was charged and the polymerization temperature maintained at 50°–55° C. The polymerization was run for about 18.5–24 hours (conversion 90–100%). Polymers were isolated/purified by precipitation in acetone and vacuum drying. An alternative procedure for isolation and purification involved dialysis of a diluted polymer solution followed by freeze drying. Table I describes homopolymerization according to the method of this Example.

TABLE I

| Homopolymers of Polyacrylamide (PAM) | | | |
|---|---|---|---|
| Sample # | AM mol | H$_2$O ml | K$_2$S$_2$O$_8$ gm |
| 9020-74CG | .42 | 500 | .05 |
| 9020-3P | .42 | 1000 | .01 |
| 9595-53P | .42 | 1000 | .005 |
| 9020-117P | .49 | 500 | .01 |

EXAMPLE 2

Copolymerization of Acrylamide with Alkyl Poly(etheroxy)acrylates (R—PEO—AC)

A 500–1000 ml quantity of distilled water was added to a resin flask equipped with a water condenser, thermometer, mechanical stirrer, as well as a nitrogen inlet and outlet. Nitrogen was bubbled through the solution for 15–30 minutes. The acrylamide (AM), Aldrich, monomer (0.21–0.42 mol) and alkyl poly(etheroxy)acrylate (R-(-PEO-)-AC) monomers (0.42–8.5×10$^{-3}$ mol) were charged to the flask. The alkyl poly(etheroxy) acrylate monomers used were commercial products of the Monomer-Polymer and Dajac Laboratories, e.g. 8615, 8616, 8617, and were used as received. The solution was heated by an oil bath under nitrogen purge at 50° C. for 1 hour. After this period of time, the $K_2S_2O_8$ initiator (0.005-0.1 g) was added and the temperature maintained at 50°-55° C. under nitrogen for about 18.5-24 hours (Conversion 70-95%). Polymers were purified by precipitation or dialysis techniques. Polymers were dried by vacuum or freeze drying. Table II describes copolymerization prepared according to this Example. The surfactant acrylate content is indicated as mole % of monomer charge.

vacuum dried at 110° C. to determine solubility and polymer concentration for all polymers. When polymer solubility did not approximate 90%, polymer concentrations were corrected.

A portion of the stock polymer solution was removed and to a known weight of solution was added 2 wt.% NaCl. Dilutions of each polymer stock solution were prepared and viscosity obtained after waiting a minimum of one hour after dilution to achieve equilibrium. The reduced viscosity or viscosity number

TABLE II

Copolymerization of Acrylamide and Alkyl Poly(etheroxy) Acrylates

| Sample # | AM mol | Comonomer Type R- | (PEO)$_x$ | Comonomer Mol × 10$^3$ | Mole % Comonomer | H$_2$O ml | K$_2$S$_2$O$_8$ g |
|---|---|---|---|---|---|---|---|
| 9595-9P | .42 | C$_9$H$_{19}$ Ph | 40 | .42 | 0.1 | 500 | .01 |
| 9020-26DY | .42 | C$_9$H$_{19}$ Ph | 40 | 1.2 | 0.3 | 500 | .01 |
| 9020-121-DFD | .42 | C$_9$H$_{19}$ Ph | 40 | 1.2 | 0.3 | 500 | 0.1 |
| 9595-54P | .42 | C$_9$H$_{19}$ Ph | 40 | 1.2 | 0.3 | 1000 | .005 |
| 9020-33DM | .21 | C$_9$H$_{19}$ Ph | 40 | 1.2 | 0.6 | 500 | .1 |
| 9595-10P | .42 | C$_9$H$_{19}$ Ph | 40 | 8.5 | 2.0 | 500 | .01 |
| 9020-136 | .21 | C$_9$H$_{19}$ Ph | 10 | 1.6 | 0.8 | 500 | .005 |
| 9020-138P | .21 | C$_9$H$_{19}$ Ph | 10 | 3.2 | 1.5 | 500 | .005 |
| 9020-61 | .21 | C$_9$H$_{19}$ Ph | 10 | 3.2 | 1.5 | 500 | .05 |
| 9020-139P | .21 | C$_9$H$_{19}$ Ph | 10 | 6.9 | 3.2 | 500 | .005 |
| 9595-3P | .42 | CH$_3$ | 40 | 1.2 | 0.3 | 500 | .01 |
| 9020-154P | .21 | Ph | 30 | 1.2 | 0.3 | 500 | .01 |
| 9595-103 | .42 | C$_{18}$H$_{35}$ | 35 | 1.3 | 0.3 | 500 | .01 |
| 9595-153P | .42 | Ph | 1 | 1.3 | 0.3 | 500 | .01 |

EXAMPLE 3

Polymer Solution Properties

The polymers were weighed (±0.001 g) into flasks; the solvents (double distilled H$_2$O, salt added where necessary) were weighed into the same flask. The polymers were allowed to agitate on a magnetic stirrer for a minimum of 48 hours or until complete solubility was achieved, as determined by visual observation. In the event a polymer solution displayed "gel" particles after a lengthy dissolution period, the solution was centrifuged at 2000 rpm for two hours to separate the "gel" from the soluble portion. A few of the more viscous solutions were subjected to an additional filtration through a 150 mesh stainless steel screen to remove any microgel particles. An aliquot was then removed and $$\left(\frac{\eta_s - \eta_o}{\eta_o c}\right)$$

where $\eta_s$ is the polymer slution viscosity (centipoise), $\eta_o$ is the solvent viscosity and c is the polymer concentration was used to compare various polymer solutions at different concentrations. Polymer concentration began at 3000 ppm to establish an initial baseline prior to dilution. Viscosity measurements were conducted at 25° C. on a Contraves Viscometer at 1.285 sec$^{-1}$. Typical data are shown in Table III. Intrinsic viscosity, [η], defined as the limit of reduced viscosity as polymer concentration goes to zero, is given in this table as dl/g. Viscosity η at shear rate at 1.2 g$^{-1}$ has the units of cps.

TABLE III

Polymer Solution Properties

| Sample # | Homo- or Copolymer | Comonomer Type R | ‒(PEO)‒ | Charged Mole % Comonomer | Conc. of Polymer ppm | [η] | NaCl Conc. % w/w | η at 1.28s$^{-1}$ | % Retention | Comments |
|---|---|---|---|---|---|---|---|---|---|---|
| 9020-74CG | Homo-(PAM) | — | — | — | 3000 | 1.6 | 0.0 | 3.0 | — | Low MW |
| | | | | | | | 2.0 | 3.0 | 100 | |
| Polysciences | Homo-(PAM) | — | — | — | 3000 | | 0.0 | 6.6 | — | |
| | | | | | | | 2.0 | 4.0 | 60 | |
| 9020-3P | Homo-(PAM) | — | — | — | 3000 | | 0.0 | 14.0 | — | |
| | | | | | | | 2.0 | 8.0 | 57 | |
| 9020-117P | Homo-(PAM) | — | — | — | 3000 | 9.0 | 0.0 | 18.0 | — | High MW |
| | | | | | | | 2.0 | 7.0 | 39 | |
| 9595-53P | Homo-(PAM) | — | — | — | 3000 | 10 | 0.0 | — | — | High MW |
| | | | | | | | 2.0 | 8.4 | — | |
| Dow Pusher[1] 700 | Co—(HPAM) | $CH_2=CH-\overset{\overset{O}{\|\|}}{C}-O-Na^{(1)}$ | | 35[1] | 3000 | 24 | 0.0 | 1250 | — | High MW + Ionic |
| | | | | | | | 2.0 | 50 | 4 | |
| 9595-9P | Co— | C$_9$H$_{19}$ Ph | 40 | 0.1 | 3000 | 5.6 | 0.0 | 6.9 | — | High MW; low [comonomer] |
| | | | | | | | 2.0 | 7.5 | 109 | |
| 9020-121DFD | Co— | C$_9$H$_{19}$ Ph | 40 | 0.3 | 3000 | 3.0 | 0.0 | 136 | — | High MW; higher |
| | | | | | | | 2.0 | 98 | 72 | |

TABLE III-continued

| Sample # | Homo- or Copolymer | Comonomer Type R | -(PEO)- | Charged Mole % Comonomer | Conc. of Polymer ppm | [η] 2% NaCl | NaCl Conc. % w/w | η at 1.28s$^{-1}$ | % Retention | Comments |
|---|---|---|---|---|---|---|---|---|---|---|
| 9020-26DY | Co— | $C_9H_{19}$ Ph | 40 | 0.3 | 3000 | 4.0 | 0.0 | 65 | — | [comonomer] |
|  |  |  |  |  |  |  | 2.0 | 75 | 115 |  |
| 9595-54P | Co— | $C_9H_{19}$ Ph | 40 | 0.3 | 3000 |  | 0.0 | — | — | High MW; |
|  |  |  |  |  |  |  | 2.0 | 233 | — | higher [comonomer] |
| 9020-33DY | Co— | $C_9H_{19}$ Ph | 40 | 0.6 | 3000 | 2.1 | 0.0 | 8.0 | — | Low MW; |
|  |  |  |  |  |  |  | 2.0 | 6.0 | 75 | higher [comonomer] |
| 9595-10P | Co— | $C_9H_{19}$ Ph | 40 | 2.0 | 2000 | 6.2 | 0.0 | 36 | — | High |
|  |  |  |  |  |  |  | 2.0 | 2.0 | 5.5 | MW; High [comonomer]; Low [polymer] |
| 9020-61 | Co— | $C_9H_{19}$ Ph | 10 | 1.5 | 3000 | 7.5 | 0.0 | 8.0 | — | Moderate |
|  |  |  |  |  |  |  | 2.0 | 6.0 | 75 | MW; Moderate [comonomer] |
| 9020-138P | Co— | $C_9H_{19}$ Ph | 10 | 1.5 | 3000 |  | 0.0 | 35 | — | High MW; |
|  |  |  |  |  |  |  | 2.0 | 5 | 14 | Moderate [comonomer] |
| 9020-139P | Co— | $C_9H_{19}$ Ph | 10 | 3.2 | 1500 | 1.6 | 0.0 | 21 | — | High |
|  |  |  |  |  |  |  | 2.0 | 1.6 | 7.6 | [comonomer]; Low [polymer]; Low MW |
| 9595-3P | Co— | $CH_3$ | 40 | 0.3 | 3000 |  | 0.0 | 5.0 | — |  |
|  |  |  |  |  |  |  | 2.0 | 5.0 | 100 |  |
| 9595-154P | Co— | Ph | 40 | 0.3 | 3000 | 6.0 | 0.0 | 4.0 | — |  |
|  |  |  |  |  |  |  | 2.0 | 4.0 | 100 |  |
| 9595-103 | Co— | $C_{18}H_{35}$ | 35 | 0.3 | 3000 | 8.0 | 0.0 | 7.2 | — |  |
|  |  |  |  |  |  |  | 2.0 | 5.6 | 77 |  |
| 9595-153P | Co— | Ph | 1 | 0.3 | 3000 | 8.0 | 0.0 | 9.0 | — |  |
|  |  |  |  |  |  |  | 2.0 | 8.0 | 89 |  |

(1)Dow Pusher 700 is a commercial copolymer of acrylamide and sodium acrylate (35%).

EXAMPLE 4

Polymer Solution Properties: Instant Copolymers vs. PAM

Table III clearly shows that the instant copolymers, especially the copolymers of nonylphenoxy poly(etheroxy)acrylates, are more efficient viscosifiers than homopolyacrylamide (PAM). Particular attention is called to polymers prepared at similar initiator and monomer charges because the ratio of $[m]/\sqrt{[I]}$ is related to polymer molecular weight, ceteris paribus. For example, the viscosity of copolymer 9595-54P can be compared with that of homopolymer 9595-53P. The viscosities of 3000 ppm solutions at 1.28 sec$^{-1}$ shear rate are 233 cps and 8.4 cps respectively. This viscosity increase (approximately 30-fold) is associated with the addition of only 0.3 mole % of the acrylate comonomer to acrylamide.

EXAMPLE 5

Polymer Solution Properties—Salt Tolerance

Table III also shows the excellent tolerance of some of the present copolymers to a brine (2% NaCl) environment. Attention is called to column (% η retention) for the instant copolymers compared with PAM and HPAM (a copolymer of acrylamide and sodium acrylate). In the preferred range of this invention (at low alkyl poly(etheroxy)acrylate R-(PEO)-AC content and/or low polymer concentrations), the instant copolymers are substantially more resistant to brine than HPAM (% η retention = 72–115% vs. 4%). At high R-(PEO)-AC contents (e.g., Sample 9595-10P with 2 mol % comonomer), the solubility limit of the polymer is approached and such comparisons are inappropriate. Of course, the solubility and degree of salt tolerance varies for each copolymer depending upon many factors, e.g., the level of R-(PEO)-AC, the length of PEO chain, the nature of R, the molecular weight of the polymer, the concentration of the polymer, etc. It is understood that the instant disclosure is presented by way of example and should not be considered as limiting.

EXAMPLE 6

Polymer Solution Properties Brine Thickening Efficiency—Instant Copolymers vs. PAM and HPAM FIG. 1 illustrates the advantages of the compositions of the instant invention compared with PAM and HPAM of the prior art. This figure presents reduced viscosity-concentration plots for the R-(PEO)-AC copolymers (0.3 mole %) compared with PAM and HPAM (Dow Pusher 700). Clearly, the instant copolymers are more efficient brine viscosifiers than PAM. In fact, the present copolymers even surpass the viscosity of the commercial copolymer HPAM above certain concentrations. This result is all the more noteworthy in view of the fact that the molecular weights of the disclosed copolymers are likely to be substantially less than that of HPAM, based upon intrinsic viscosity measurements. The $[\eta]_{2\%NaCl}$ of the instant copolymers (e.g., 9020-121DFD and 9020-26DY) are 3–4 while that of HPAM is 24 (Table III).

What is claimed is:

1. A free radical copolymerization process for the formation of a water soluble copolymer of acrylamide-/alkyl poly(etheroxy)acrylate which comprises the steps of:
   (a) forming an aqueous reaction solution from a water soluble acrylamide monomer, deoxygenated water under a nitrogen atmosphere and a water soluble alkyl poly(etheroxy)acrylate;
   (b) heating said reaction solution to at least 50° C.;
   (c) adding sufficient free radical initiator to said reaction solution to initiate copolymerization of said acrylamide monomer and said alkyl poly(etheroxy)acrylate monomer; and
   (d) polymerizing said acrylamide monomer and said alkyl poly(etheroxy)acrylate monomer in said reaction solution for a sufficient period of time, at a sufficient temperature to form said copolymer.

2. A free radical copolymerization process according to claim 1, further including means for recovering said copolymer from said reaction solution.

3. A free radical process according to claim 1 wherein said copolymer is water soluble.

4. A free radical process according to claim 3 wherein said copolymer has substantially the formula:

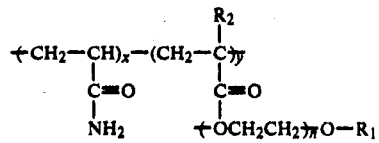

wherein $R_1$ is selected from the group consisting of $C_1$ to $C_{20}$ alkyl groups, $C_6$ to $C_{20}$ aryl groups and $C_6$ to $C_{30}$ alkylaryl groups, $R_2$ is hydrogen or methyl group, n is about 23 to 60, y is about 0.01 to about 5.00 mole %, and x is about 95.00 to about 99.99 mole %.

5. A free radical copolymerization process according to claim 1 wherein said $R_1$ is an alkyl group having about 1 to about 20 carbon atoms.

6. A free radical copolymerization process according to claim 4 wherein n is about 1 to about 60 mole %, y is about 0.04 to about 3.0 mole % and x is about 97.0 to about 99.0 mole %.

7. A free radical copolymerization process according to claim 1 wherein said reaction solution is maintained at a temperature of at least about 40° C. for at least about 5 hours.

8. A free radical copolymerization process accordig to claim 1 wherein said free radical initiator is selected from the group consisting of AIBN, $H_2O_2$, $H_2O_2$/Fe, $H_2O_2$/Ce (IV), and potassium persulfate.

* * * * *